S. F. MILLARD.
RESILIENT TIRE.
APPLICATION FILED JAN. 29, 1916.

1,179,859.

Patented Apr. 18, 1916.
2 SHEETS—SHEET 1.

Inventor
Samuel F. Millard
By Lancaster and Allwine
His Attorneys

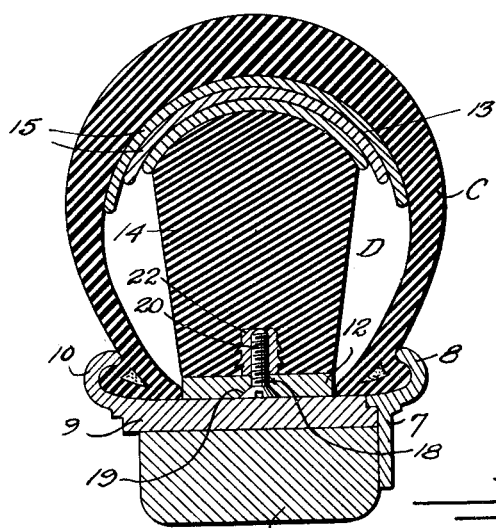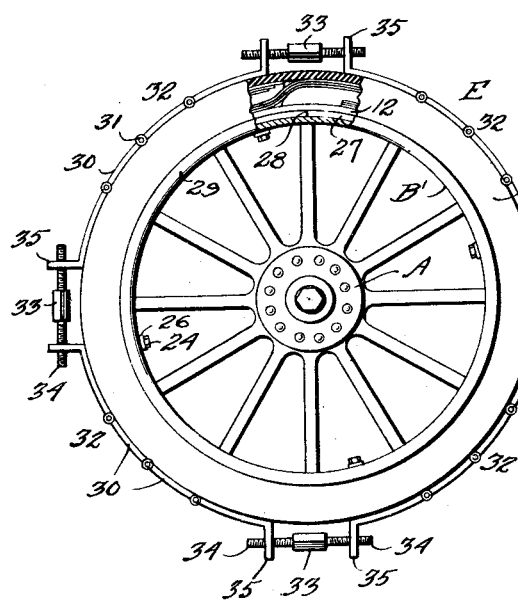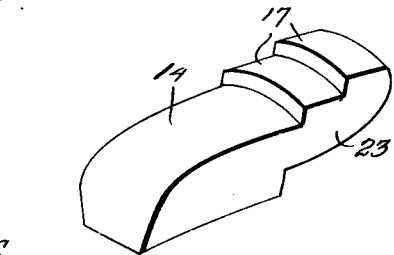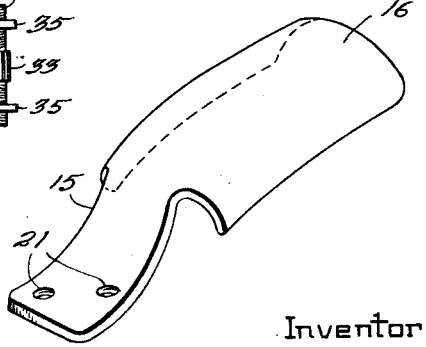

UNITED STATES PATENT OFFICE.

SAMUEL F. MILLARD, OF NORWALK, CONNECTICUT.

RESILIENT TIRE.

1,179,859.  Specification of Letters Patent.  Patented Apr. 18, 1916.

Application filed January 29, 1916. Serial No. 74,958.

*To all whom it may concern:*

Be it known that I, SAMUEL F. MILLARD, a citizen of the United States, residing at Norwalk, in the county of Fairfield and State of Connecticut, have invented a new and useful Resilient Tire, of which the following is a specification.

My present invention relates to resilient tires embodying a rim supported shock absorbing means, and an outer protecting casing therefor, such as the outer casing of a pneumatic tire.

The principal object of my invention is to provide a tire structure which will do away with inflated inner tubes, the shock incidental to the use of the tire being absorbed by springs and yieldable supports therefor, such as rubber abutments. It is to be observed that, with a tire of this character, punctures or blowouts, and all annoyances prevalent with pneumatic tires, such as leaky valves, valve connections, etc., are avoided.

Other objects of the invention are to provide a tire structure which may be easily placed into operative relation to existing vehicle wheels, or constructed with the shock absorbing means as a permanent part of the wheel, with a removable outer casing, and a shock absorbing means which will remain in good repair, without attention, for a considerable length of time.

Another object of the invention is to provide an inner shock absorbing means which will effectively support the load even though the outer casing may become worn considerably, torn or removed entirely from the wheel, the prime function of the outer casing being to protect the inner structure from sand, moisture, and other injurious elements.

Figure 1:
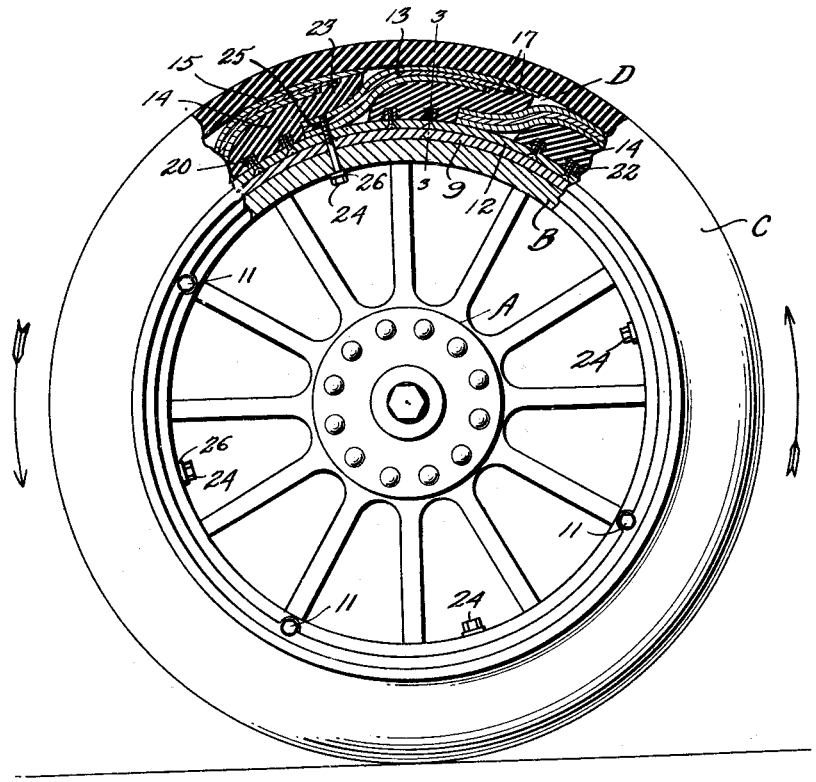
Figure 2:
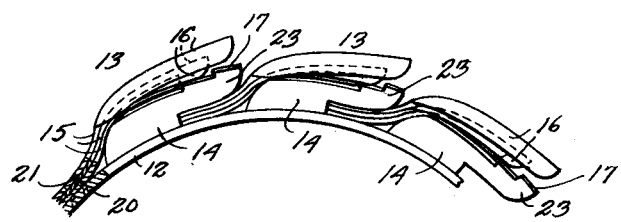

Other objects of the invention will appear in the following detailed description, taken in connection with the accompanying drawings forming a part of this specification, and in which drawings:

Figure 1 is a side elevation of a vehicle wheel, showing a tire constructed according to my invention, applied thereto, part being shown in section to disclose details. Fig. 2 is a fragmentary side elevation of a portion of the inner shock absorbing means. Fig. 3 is an enlarged sectional view on the lines 3—3 of Fig. 1. Fig. 4 is a perspective view of a spring forming a part of the inner shock absorbing means. Fig. 5 is a similar view disclosing the yieldable support or rubber abutment forming a part of the shock absorbing means. Fig. 6 is a side elevation of a vehicle wheel showing the application of my invention thereto, and more particularly the assemblage of the structure to a wheel having the tire receiving rim formed of one integral piece.

In the drawings, where similar characters refer to similar parts throughout the several views, A designates a vehicle wheel, B the felly thereof, C an outer tire casing, and D, rim supported shock absorbing means.

While I hereinafter disclose my invention as applied to vehicle wheels of the demountable, and permanent rim types, it is to be understood that the inner shock absorbing means D may be applied directly to the wheel or tire receiving rim, without departing from the spirit or scope of my invention.

Referring first to Figs. 1 and 3, where the tire structure is shown applied to a wheel having a demountable rim embodying a ring 7 provided with a bead flange 8, coöperating with a permanent rim 9, provided with a similar flange 10, it is understood that in assemblage, the ring 7 is removed by releasing bolts 11 or equivalent fastening devices. The means D preferably comprises a band 12, a plurality of sets of leaf springs 13, and a plurality of yieldable abutments 14, more clearly shown in Fig. 2. Each set of leaf springs 13 is made up of a plurality of springs 15 extending tangentially from the band 12, with their free end portions 16 spaced therefrom. These free end portions 16 are preferably arcuated longitudinally and transversally so as to fit nicely within the outer casing C, and are in juxtaposed relation, and relatively shorter in length as their proximity approaches the band 12. Yieldable abutments may be formed of rubber and stepped, as at 17, to fit inwardly of the extensions, of the longer springs 15, as clearly shown in Fig. 1, the abutments 14 serving to support the springs 15 and in combination with which, they substantially fill the casing C inwardly of the tread portion of the latter.

The band 12 may be provided with a plurality of radial bores 18, having countersinks 19 at its inner face, to receive screws 20, by which the sets of springs 13 and abutments 14 may be secured to the band. The screws 20 for securing the sets of springs in place, may enter screw threaded apertures 21 in the springs 15, while those screws 20 for securing the abutments 14 in place, may enter a screw threaded socket 22 embedded in the body portion of the abutment. In this connection, it is to be observed that, when the screws 20 are turned tight, and the band 12 is fited tightly about the periphery of the wheel A, these screws cannot become loose, hence the shock absorbing means cannot become dismembered due to vibration.

It is preferred to form the abutments 14 with their outer faces convex, as clearly shown in Fig. 5, to fit the concavity of springs 15, and these abutments are provided with the step extension 23 which rests above the tangential portion of the next adjacent set of springs 13. It is also preferred to secure the inner shock absorbing means against creeping with respect to the wheel rim, by attaching bolts 24 radially through the wheel felly B, the band 12 and into screw threaded apertures 25, formed in certain sets of the springs 13, lock washers 26 of any suitable type, being provided to prevent accidental displacement of the bolts 24. It is not necessary to have a bolt 24 for each set of springs 13 but these fastening devices may be distributed throughout the wheel rim at intervals.

In the application of my invention to that type of wheel rim B' which is not demountable, it is found desirable to first place a split band 27 separable as at 28, the periphery of which is substantially level with the outer periphery of tire bead flange 29, whereupon the band 12 is supported by the wheel rim B', through the intermediacy of split band 27. In order to place the beads of outer casing C into operative relation to the bead flanges 29 a detachable depressing device, designated generally by character E is provided. This device comprises a plurality of links 30, hinged as at 31, the sets of links being divided into sections 32, joined at various intervals by means of turn buckles 33, the screw threaded stems 34 of which have screw threaded engagement with outstanding lugs 35 formed on certain of the links. By arranging the device E about the tread portion of outer casing C, the shock absorbing means may be compressed sufficiently to enable the beads of casing C to be placed.

When the device E is not in use, it may be folded and transported with the vehicle as an accessory, occupying but small space.

From the foregoing it is made manifest that I have provided a resilient tire, depending in no way upon an inflated inner tube but which, in all appearances resembles the pneumatic tire now in common use. All shocks incidental to the use of the tire are absorbed by the sets of springs 13 and yieldable abutments 14, in addition to the resiliency of the outer casing C. Should the outer casing become damaged, so as to expose the outermost spring 15 of any set 13, the tire will continue to serve its function for a considerable length of time without material damage to the shock absorbing structure.

Changes in details may be made without departing from the spirit or scope of my invention; but,

I claim:

1. In shock absorbing means for tires, the combination of a band, a plurality of sets of leaf springs carried by said band and extending tangentially therefrom with their free end portions spaced from said band, the springs of each set being in juxtaposed relation and relatively shorter in length as their proximity approaches said band, and a plurality of stepped yieldable abutments carried by said band, one inwardly of the free end portions of each set of springs.

2. In shock absorbing means for tires, the combination of a band, a plurality of sets of springs carried by said band and extending tangentially therefrom with their free end portions arcuated longitudinally and spaced from said band, the springs of each set being in juxtaposed relation and relatively shorter in length as their proximity approaches said band, and a plurality of stepped yieldable abutments carried by said band, one inwardly of the free end portions of each set of springs.

3. In shock absorbing means for tires, the combination of a band, a plurality of sets of leaf springs carried by said band and extending tangentially therefrom with their free end portions arcuated transversally and spaced from said band, the springs of each set being in juxtaposed relation and relatively shorter in length as their proximity approaches said band, and a plurality of stepped yieldable abutments carried by said band and having their outer surfaces convex, one abutment inwardly of the free end portions of each set of springs.

4. In shock absorbing means for tires, the combination of a band, a plurality of sets of leaf springs carried by said band and extending tangentially therefrom with their free end portions arcuated longitudinally and transversally, and spaced from said band, the springs of each set being in juxtaposed relation and relatively shorter in length as their proximity approaches said band, and a plurality of stepped yieldable abutments carried by said band and having their outer surfaces convex, one abutment inwardly of the free end portions of each set of springs.

SAMUEL F. MILLARD.

Witnesses:
 DAVID J. SHEEHAN,
 RAYMOND TOBIE.

Copies of this patent may be obtained for five cents each, by addressing the "Commissioner of Patents, Washington, D. C."